(12) United States Patent
Hooper

(10) Patent No.: US 8,161,250 B2
(45) Date of Patent: Apr. 17, 2012

(54) METHODS AND SYSTEMS FOR PARTIALLY-TRANSACTED DATA CONCURRENCY

(75) Inventor: Harold Scott Hooper, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 420 days.

(21) Appl. No.: 12/469,039

(22) Filed: May 20, 2009

(65) Prior Publication Data

US 2010/0299487 A1    Nov. 25, 2010

(51) Int. Cl.
    *G06F 12/14*    (2006.01)
(52) U.S. Cl. .................... 711/152; 711/147
(58) Field of Classification Search .............. 711/152, 711/147
    See application file for complete search history.

(56) References Cited

U.S. PATENT DOCUMENTS

| | | | |
|---|---|---|---|
| 5,263,161 A | 11/1993 | Barth | |
| 5,442,758 A | 8/1995 | Slingwine | |
| 6,484,185 B1 | 11/2002 | Jain | |
| 7,188,344 B1 | 3/2007 | Blue | |
| 7,665,143 B2 * | 2/2010 | Havens et al. | 726/26 |
| 2006/0212450 A1 * | 9/2006 | Earhart | 707/8 |
| 2006/0242644 A1 * | 10/2006 | Blue | 718/100 |
| 2008/0263339 A1 * | 10/2008 | Kriegel et al. | 712/228 |

* cited by examiner

*Primary Examiner* — Michael Tran
(74) *Attorney, Agent, or Firm* — Law Office of Gerald Maliszewski; Gerald Maliszewski

(57) ABSTRACT

Aspects of the present invention comprise systems and methods for protecting multi-threaded access to shared memory. Some aspects provide higher data concurrency than other methods. Some aspects relate to methods and systems that provide access to data for all threads during the first phases of one thread's write operation. Some aspects provide all threads access to a particular data unit until one thread enters the commit phase of the write operation. Some aspects manage a computing data resource such that, when a thread enters the commit phase, all pending read requests are fulfilled, all pending write requests are allowed to proceed to commit phase at which point they are blocked, all new read and write requests are blocked and the commit phase is completed by updating the target data and releasing the blocked requests. Some aspects provide improved concurrency by performing reduced cross-thread interference. Some aspects may be implemented at any level from hardware to high-level languages. Some aspects protect readers from accessing partial write results which avoids retry semantics and data corruption.

19 Claims, 4 Drawing Sheets

METHODS AND SYSTEMS FOR PARTIALLY-TRANSACTED DATA CONCURRENCY

FIELD OF THE INVENTION

Embodiments of the present invention comprise methods and systems for protecting multi-threaded access to shared memory that provide higher data concurrency than other methods.

BACKGROUND

In multithreaded environments where memory is shared, there is the potential for one thread to read data that is being written by another, resulting in incomplete or corrupt data. There is therefore a need to protect shared resources and assure that updates to the resource are atomic with respect to other threads.

SUMMARY

Some embodiments of the present invention comprise methods and systems for protecting multi-threaded access to shared memory that provide higher data concurrency than other methods. Some embodiments comprise methods and systems that provide access to data for all threads during the first phases of one thread's write operation. In some embodiments, all threads are allowed access to a particular data unit until one thread enters the commit phase of the write operation. In some embodiments, when a thread enters the commit phase, all pending read requests are fulfilled, all pending write requests are allowed to proceed to commit phase at which point they are blocked, all new read and write requests are blocked and the commit phase is completed by updating the target data and releasing the blocked requests.

This invention provides improved concurrency by performing reduced cross-thread interference. Embodiments can be implemented at any level from hardware to high-level languages. Some embodiments, protect readers from accessing partial write results which avoids retry semantics and data corruption.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention provide an improvement to current methods of protecting shared memory in multithreaded systems. One benefit of these embodiments is to improve thread concurrency by reducing interference between threads. Another benefit of some embodiments is to provide a mechanism that is implementable in legacy systems without additional hardware or software system requirements.

Some embodiments of the present invention comprise an improved lock mechanism by incorporating an explicit memory access pattern. The core strategy is to postpone write-based blocking until the commission of write operations. The underlying assumption is that committing writes to memory takes less time than an entire write operation.

To further illustrate, consider the process of updating a particle in a physics based system. The particle state may include position, velocity, and several forces. A typical update may involve numerous read, update, and write operations, all of which would be encapsulated by a mutual-exclusion lock so that the state appears updated atomically (so that all members of state are consistent).

Figure 1:
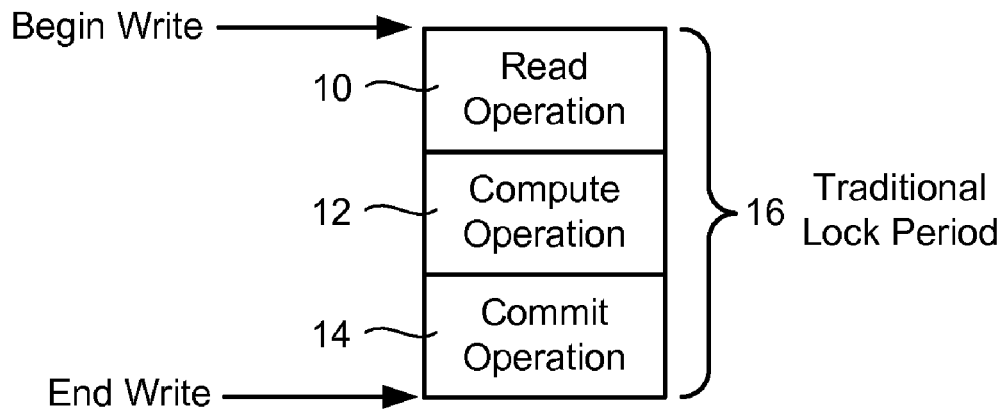
FIG. 1 is a diagram showing the phases and the blocking period of a traditional prior art write operation.

Using traditional locking mechanisms, as illustrate in FIG. 1, the duration of a traditional lock 16 may include at least a read operation 10 consuming time to read the state, a compute operation 12 consuming time to perform one or more computations based on the state, and a commit operation 14 consuming time to return new values to the state members.

Figure 2:
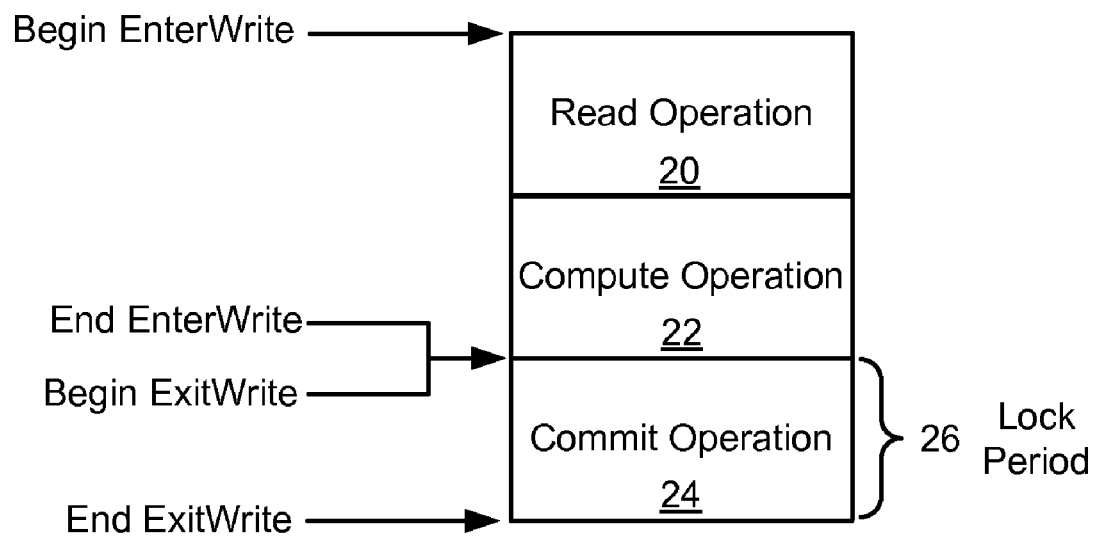
FIG. 2 is a diagram showing the phases and the blocking period of an exemplary embodiment of the present invention.

In contrast, using embodiments of the present invention, as illustrated in FIG. 2, a mutual exclusion lock 26 may only be necessary during the commit phase 24 thereby allowing access during any read operation 20 or compute operation 22. This is because embodiments of the present invention effect a separation between a readable copy and a writable copy of the state. So, in the illustrative example, a memory copy of the state can be made, via hardware registers (copy is retained in the registers), cache (CPU cache), main memory (via software), hardware backing-store or by other methods. Thus, the original state is blocked 26 only when the updated copy is written back, reducing the block time to only a memory write or commit operation 24 and eliminating the time delay of reading 20 and computations 22.

Note that, in some embodiments, the term "copy" may mean only that the write operations are storing to a different location than that which the read operations are reading from. An implementation of this invention can be realized via any mechanism that implements such an algorithm, such as by swapping memory pointers (ping-ponging memory images), stalling writes, cache flushes or other methods.

In some embodiments, each resource may be associated with a lock state. The lock state may be any of the following:

1) None
2) Read
3) Write
4) Read+Write
5) Commit

The physical embodiment of a state may vary with each implementation.

As threads try to access the resource, they may declare their intent (read or write) by executing either an EnterRead or EnterWrite algorithm. When they finish an operation, they may indicate such by executing either the ExitRead or Exit-Write algorithm. The following state table, Table 1, shows exemplary state transitions for the lock state, where the current state is shown across the top and the algorithm to be executed is shown at left. For example, when the state is None, executing EnterWrite will cause the state to become Write.

TABLE 1

|  | None | Read | Write | Read + Write | Commit |
| --- | --- | --- | --- | --- | --- |
| EnterRead | Read | Read[1] | Read + Write | Read + Write | BLOCK[3] |
| ExitRead | ERROR | None[2] | ERROR | Write[2] | UNBLOCK[4] |
| EnterWrite | Write | Read + Write | Write[1] | Read + Write | BLOCK[3] |
| ExitWrite | ERROR | ERROR | Commit | Commit | BLOCK[3] |

[1] A counter will be incremented.
[2] The state may not actually change; a counter is decremented, and only if 0 does the state change.
[3] No state change occurs; the thread is blocked before returning from the algorithm.
[4] The read or write counters are decremented. If they are both zero, the write results are committed, the state is changed to None, and all blocked threads are released in order and their algorithms re-executed.

In these exemplary embodiments, readers and writers proceed unhindered. All readers share a common copy of the resource; each writer acquires a unique copy.

In these exemplary embodiments, when an ExitWrite occurs:
the Commit state is entered
the ExitWrite operation blocks until all outstanding readers and writers have retired
All new Readers and writers are blocked until the Commit is completed In some known methods, all readers and writers are blocked for the entirety of the EnterWrite→ExitWrite sequence. However, in these embodiments, the blockages are restricted only to the ExitWrite operation. In some embodiments, serialization of resource accesses may not be guaranteed. For example, given two threads executing EnterWrite and EnterRead, in that literal order, the reading thread cannot know whether it will receive the version of the resource before the write operation began or after it finished. The following might occur:

Example 1

Thread A: BeginWrite
Thread B: BeginRead
[End . . . operations occur in either order]

Example 2

Thread A: BeginWrite
Thread A: EndWrite
Thread B: BeginRead
Thread B: EndRead

Clearly, thread B will see different versions in these examples; in Example 1, thread B will see the version before the write, and in Example 2 it will see the version after the right. In some applications, this is acceptable or desired. Each reader will see a self-consistent, complete version of the resource, although it may change immediately when the thread finishes reading it.

3-D Modeling Software Embodiment

In 3-D modeling software, such as video games, a virtual world (or some portion thereof) may be modeled in PC memory in the form of [n] objects, each containing attributes that determine an object's location, appearance or other game characteristics. A typical game may have thousands of such objects; some being static parts of the environment, and many being dynamic, representing live entities such as other players.

On current and future hardware, there is a need for wide, threaded execution, whereby objects can be accessed by many threads simultaneously.

Now, consider the situation where [n] objects are interacted with by [m] threads. Some threads are responsible for rendering (read only access), while others are responsible for model updates (moving characters, etc; write operations). Each model update may be a lengthy operation including but not limited to:

1) Considering the "presumed update" such as position, and
a. Checking (reading) many other model objects to perform collision detection
b. Sending and receiving network data to verify against other models Hence, each update operation may encapsulate significant processing, as well as many bracketed read operations to the same resource, or other resources, even in cases where only a few bytes will ultimately be written.

Using traditional concurrency mechanisms, a write to some number of objects may stall rendering or other program features due to the mutual exclusion nature of the mechanism. Moreover, since writers block all readers, it would be difficult to ensure that race conditions don't occur when reads are bracketed by writes to objects being read by other writers.

Accordingly, embodiments of the present invention may introduce some additional memory overhead but [in some cases] may also dramatically reduce resource contention, freeing threads to get more work done in less time.

Real-Time Measurements

Experimental results show a much higher level of concurrency using an exemplary embodiment of the present invention. Total program throughput ranged from 0.98 (just slightly slower than simple reader+writer locking) to 3.4 (more than three times faster), depending upon specific software design and hardware capability.

For further clarification, two logical and two physical embodiments will be discussed.

Logical Embodiments

1. Mutual Write Embodiments

In these embodiments, any number of readers and writers can proceed concurrently, with threads being blocked only during the commission of any write. The side-effect of this logic is a lack of serialization. For example, if the protected resource is an integer, and the operation is the simple addition of 1, the result of approximately simultaneous writers is ambiguous. If the starting value is 1 and three writes occur, the result could be 2, 3, or 4, depending upon how much concurrency there was between the writers (whether they began with the same start value, or were executed somewhat more serially such that one or more began with the resulting value from the other).

Figure 3:
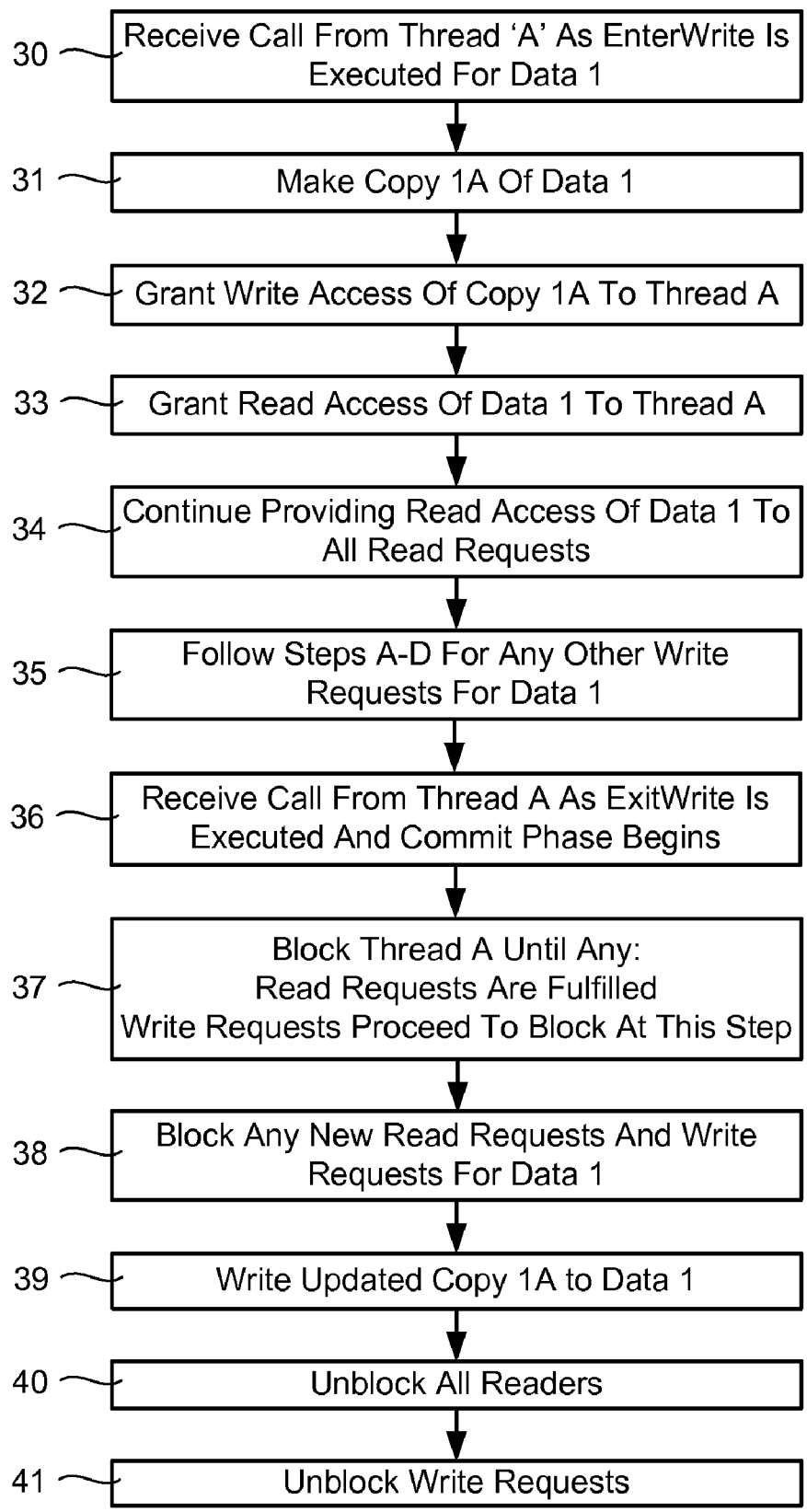
FIG. 3 is a diagram showing steps of an exemplary data management process comprising a mutual write process.

In some exemplary embodiments, the following process, illustrated in FIG. 3 may be executed. In these embodiments, described from the perspective of a memory or resource manager, a manager receives a call 30 from Thread "A" as Thread "A" executes an EnterWrite or similar process directed to updating data referred to as "Data 1." In response to receiving the call 30, the manager makes 31 a copy of Data 1, which we will refer to as "Copy 1A." Copy 1A is a copy of the data represented by Data 1 one, but stored at a different address so it can be modified without affecting Data 1. This copy process may take place immediately after the call 30 is received or at any time up until Thread A enters the commit phase. The manager grants 32 write access of Copy 1A to Thread A only and continues to grant 33 read access of Data 1 to Thread A. Thread A has no need of read access of Copy 1A as read access of Data 1 is preserved at this time. The manager also continues to provide 34 read access of Data 1 to any other threads that request read access.

Steps 30 to 33 may be repeated 35 for any other threads that seek write access to Data 1, thereby causing the creation of additional copies of Data 1 (e.g., Copy 1B), for which exclusive write access is granted to the treads that have requested them. At some point, Thread A will complete any reading and computing phases of its operation by writing an updated value to Copy 1A and will execute 36 an ExitWrite or similar operation that will signal to the manager that the thread is ready to enter a commit phase. Upon receipt of this ExitWrite or similar call 36, the manager may then block 37 Thread A until: a) any pending read requests are fulfilled and b) any pending write requests have followed similar procedures to Thread A's write request and are also blocked. At this point, for the commit phase, any new read requests and write requests for Data 1 are blocked 38 briefly. During the read/write blockage 38, updated Copy 1 data, which was written to Copy 1 by Thread A, is written 39 to Data 1. Following this write operation, all readers are unblocked 40. If any write requests have been blocked, each write request may then be unblocked, in turn, and allowed to follow a process similar to that explained for Thread A. This process may repeat for each blocked write request. In these embodiments, blocked write requests may be unblocked in any order or randomly and no specific queue or order need be maintained. However, in some embodiments, write requests may be unblocked in the order in which their respective threads requested write privileges.

Figure 4:
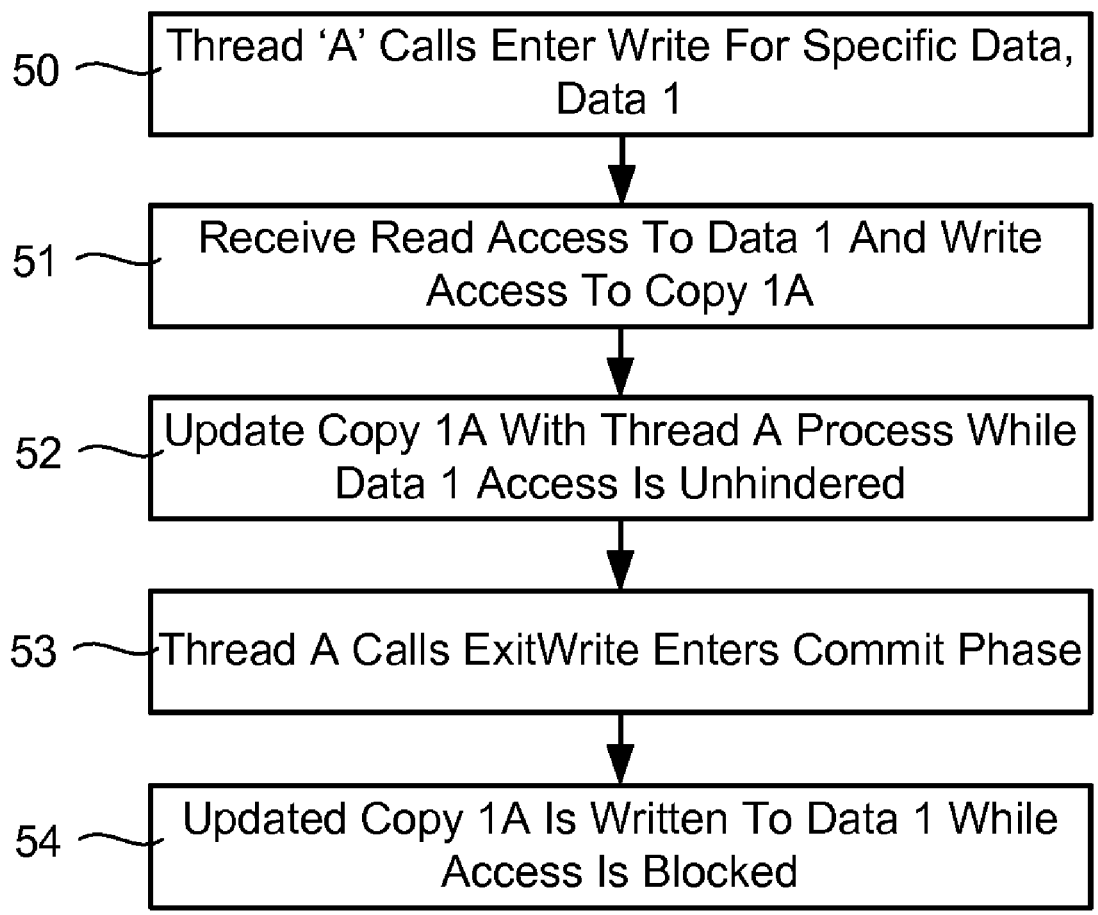
FIG. 4 is a diagram showing steps of an exemplary data management process comprising a mutual write process from the perspective of a participating thread.

Some of these embodiments may be described from the perspective of a thread that is attempting to write or update data. In these embodiments, illustrated in FIG. 4, Thread A may execute 50 an EnterWrite operation or a similar operation that sends a request to a memory or resource manager indicating that Thread A wants to write a value to Data 1. In response, the manager may grant and Thread A may receive 51 write access to a copy of Data 1, referred to as Copy 1A. In some embodiments, Copy 1A may be created in response the request received from Thread A. Thread A may then proceed to read from Data 1, if desired, and may compute, if desired, any values based on Data 1. In some embodiments, Thread 1 may not need to read from Data 1 or compute any values, however, using these embodiments, access to Data 1 is preserved to any threads that desire read or write access during a read or computation process executed by Thread A.

Thread A may then update or write 52 a value to Copy 1A, wherein this value is intended for Data 1. At this point, Thread A may execute an ExitWrite operation or a similar operation that indicates 53 to the manager that it wishes to enter the commit phase to update Data 1. When this occurs, Thread A is blocked until any pending read requests are fulfilled and until any other write requests for Data 1 are also blocked. Any new read or write requests for Data 1 are also blocked while the manager copies data from Copy 1A to Data 1 so as to update Data 1 with data originating from Thread A. After new data is written to Data 1, all read requests may be unblocked and any write requests may be unblocked, however, these operations will have no impact on Thread A unless it has requested further read and/or write operations.

2. Exclusive Write

This embodiment also comprises the advantage that blocking is only performed during the commit operation, but further imposes a restriction that writes are serialized, such that when any writer uses EnterWrite, other writers are blocked until the first write operation completes. This embodiment would resolve the integer ambiguity, requiring that for any [n] writers, writer [m] sees the results of writer [m−1] as the resource's initial value. Table 2 represents a state table for these embodiments.

TABLE 2

|  | None | Read | Write | Read + Write | Commit |
|---|---|---|---|---|---|
| EnterRead | Read | Read[1] | Read + Write | Read + Write | BLOCK[3] |
| ExitRead | ERROR | None[2] | ERROR | Write[2] | UNBLOCK[4] |
| EnterWrite | Write | Read + Write | BLOCK[3] | Read + Write | BLOCK[3] |
| ExitWrite | ERROR | ERROR | Commit | Commit | ERROR |

[1]A counter will be incremented.
[2]The state may not actually change; a counter is decremented, and only if 0 does the state change.
[3]No state change occurs; the thread is blocked before returning from the algorithm.
[4]The read or write counters are decremented. If they are both zero, the write results are committed, the state is changed to None, and all blocked threads are released in order and their algorithms re-executed.

Figure 5:
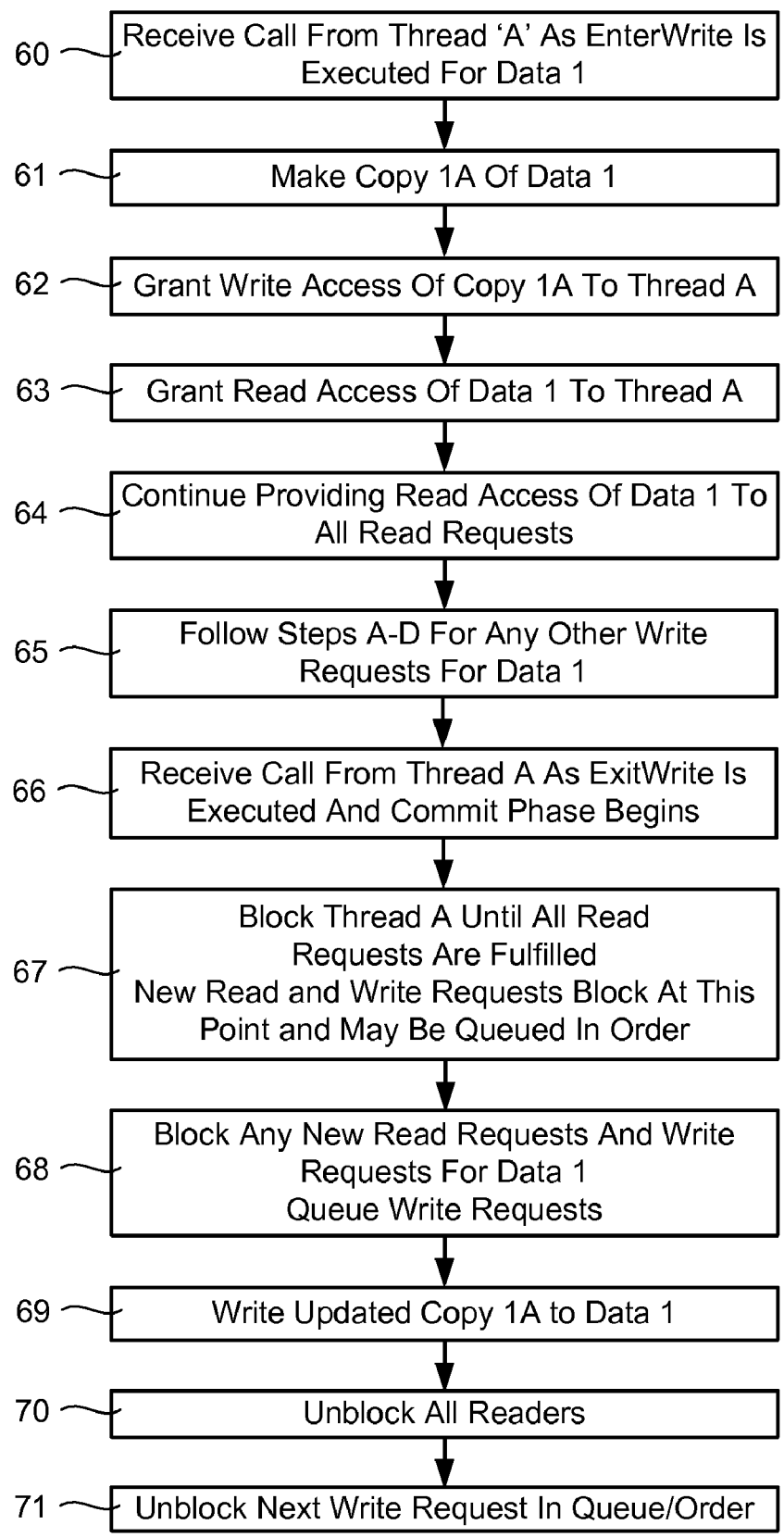
FIG. 5 is a diagram showing steps of an exemplary data management process comprising an exclusive write process.

In some exemplary embodiments, the following process, illustrated in FIG. 5 may be executed. In these embodiments, described from the perspective of a memory or resource manager, a manager receives a call 60 from Thread "A" as Thread "A" executes an EnterWrite or similar process directed to updating data referred to as "Data 1." In response to receiving the call 60, the manager makes 61 a copy of Data 1, which we will refer to as "Copy 1A." Copy 1A is a copy of the data represented by Data 1 one, but stored at a different address so it can be modified without affecting Data 1. This copy process may take place immediately after the call 60 is received or at any time up until Thread A is ready to enter the commit phase. The manager grants 62 write access of Copy 1A to Thread A only and continues to grant 63 read access of Data 1 to Thread A. Thread A has no need of read access of Copy 1A as read access of Data 1 is preserved at this time. The manager also continues to provide 64 read access of Data 1 to any other threads that request read access.

Steps 60 to 63 may be repeated 65 for any other threads that seek write access to Data 1, thereby causing the creation of additional copies of Data 1 (e.g., Copy 1B for Thread B), for which exclusive write access is granted to the treads that have requested them. At some point, Thread A will complete any reading and computing phases of its operation by writing an updated value to Copy 1A and will execute 66 an ExitWrite or similar operation that will signal to the manager that the thread is ready to enter a commit phase. Upon receipt of this ExitWrite or similar call 66, the manager may then block 67

Thread A until: a) any pending read requests are fulfilled and b) any pending write requests have followed similar procedures to Thread A's write request and are also blocked and managed. Management of blocked write requests may be handled in several ways. In some embodiments, a queue may be constructed to maintain an order of release for the blocked write requests. This order may be the order in which the write requests are received by the manager or some other order. In some embodiments, the blocked write requests may be maintained in a pool and later released in the order in which they execute an ExitWrite operation. In other embodiments, locked write requests may later be released in other orders or randomly at appropriate times.

At this point, any new read requests and write requests for Data 1 are blocked 68 briefly. These blocked read and write requests may also be managed with queues or by other methods such as those described for the already-executing write requests above. During the read/write blockage 68, updated Copy 1 data that was written to Copy 1 by Thread A is written 69 to Data 1. Following this write operation, all readers are unblocked 70. If any write requests have been blocked and queued 67, the next write request in the queue may then be unblocked and allowed to follow a process similar to that explained for Thread A. This process may repeat for each blocked and queued write request.

Performance of these embodiments from the perspective of Thread A will be essentially the same as that described above in relation to FIG. 4. However, other threads, which have requested write access to Data 1 after Thread A may be treated differently based on management of blocked write requests as explained above.

Physical Embodiments

1. Software Embodiments

These embodiments may be easily implemented in nearly any programming language in use today. They can be built from scratch, or built using a current synchronization mechanisms as a basis. Furthermore, some embodiments may be added to a language compiler in such a way as to be realized at runtime without explicit coding on the part of the programmer.

2. Hardware Embodiment

These embodiments may be implemented in hardware by, for example, adding a "backing store" of memory that is used for write operations and a trivial set of instructions that can be used to commit writes to shared memory.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for protecting multi-threaded access to shared memory, said method comprising:
    a) providing, via a computing device comprising a processor and a memory, limited access to a shared memory resource, wherein said limited access is provided when one or more threads are entering a read operation on said shared memory resource, exiting a read operation on said shared memory resource and during at least a portion of a write operation on said shared memory resource;
    b) blocking, via said computing device, said access to said shared memory resource when one or more threads is exiting a write operation on said shared memory resource, wherein said exiting a write operation causes execution of a commit operation wherein data is written to said shared memory resource; and
    wherein said providing limited access to a shared memory resource comprises making a copy of at least a portion of said shared memory resource and granting exclusive write access to a thread requesting said copy when said thread requests a write operation.

2. A method as described in claim 1 further comprising unblocking said access to said shared memory resource after said commit operation, wherein said unblocking comprises unblocking write requests that were pending when exiting said write operation before unblocking newer write requests.

3. A method as described in claim 2 wherein said unblocking write requests that were pending when exiting said write operation comprises unblocking in the order in which said write requests exited the write operation.

4. A method as described in claim 2 wherein said unblocking write requests that were pending when exiting said write operation comprises unblocking in the order in which said write requests entered the write operation.

5. A method as described in claim 2 wherein said unblocking newer write requests comprises unblocking in the order in which said newer write requests entered the write operation.

6. A method for protecting multi-threaded access to shared memory, said method comprising:
    a) providing read access to a data element, Data 1, of a shared memory resource for a plurality of threads, said providing being performed by a computing device comprising a processor and memory;
    b) receiving, at said computing device, a write request for said data element, Data 1, from Thread A, which is one of said plurality of threads;
    c) creating, with said computing device, a new data element, Copy 1A, with an initial value copied from Data 1;
    d) granting exclusive write access for Copy 1A to Thread A, wherein said granting is performed by said computing device;
    e) maintaining read access to said plurality of threads, including Thread A, for Data 1 after receiving said write request from Thread A, wherein said maintaining is performed by said computing device;
    f) receiving a commit request from Thread A to exit a write process initiated by said write request by entering a commit phase wherein the value in Copy 1A will be written to Data 1 and made accessible to all threads by said computing device;
    g) blocking Thread A, with said computing device, until
        i) all pending read requests from 5 other threads are fulfilled, and
        ii) all pending write requests from other threads have progressed to blocking;
    h) blocking any new read requests and write requests for Data 1 with said computing device;
    i) writing the value in Copy 1A to Data 1, with said computing device;
    j) unblocking all read requests after said writing with said computing device; and
    k) unblocking each write request in succession with said computing device.

7. A method as described in claim 6 further comprising updating Copy 1A with a value determined by Thread A before said writing the value of Copy 1A to Data 1.

8. A method as described in claim 7 wherein said value determined by Thread A is determined based on a current value of Data 1.

9. A method as described in claim 6 further comprising continuing to receive write requests for Data 1 during said maintaining read access to said plurality of threads after receiving said write request from Thread A.

10. A method as described in claim 6 wherein said unblocking each write request in succession comprises unblocking said pending write requests before said new write requests.

11. A method as described in claim 6 wherein said unblocking each write request in succession comprises unblocking said pending write requests in the order in which they request a commit operation.

12. A method as described in claim 6 wherein said unblocking each write request in succession comprises unblocking said new write requests in the order in which said new write requests are received.

13. A method as described in claim 6 wherein said unblocking each write request in succession comprises unblocking said pending write requests in the order in which they request a commit operation and unblocking said new write requests, after unblocking said pending write requests, in the order in which said new write requests are received.

14. An apparatus for protecting multi-threaded access to shared memory, said apparatus comprising:
   a) a data manager comprising a processor and a shared memory resource, said data manager comprising;
      i) an access manager for providing read access to a data element, Data 1, of said shared memory resource to a plurality of threads;
      ii) a receiver for receiving a write request for said data element, Data 1, from Thread A, which is one of said plurality of threads;
         (1) wherein said data manager creates a new data element, Copy 1A, with an initial value copied from Data 1 in response to said receiving a write request;
         (2) wherein said data manager grants exclusive write access for Copy 1A to Thread A;
         (3) wherein said data manager maintains read access to said plurality of threads, including Thread A, for Data 1 after receiving said write request from Thread A;
      iii) a second receiver for receiving a commit request from Thread A,
         (1) wherein said data manager exits a write process initiated by said write request by entering a commit phase wherein the value in Copy 1A will be written to Data 1 and made accessible to all threads in response to said receiving a commit request;
      iv) a first blocker for blocking Thread A until
         (1) all pending read requests from other threads are fulfilled, and
         (2) all pending write requests from other threads have progressed to blocking;
      v) a second blocker or blocking any new read requests and write requests for Data 1;
      vi) a memory writer for writing the value in Copy 1A to Data 1;
         (1) wherein said first blocker and said second blocker unblock all read requests after said writing; and
         (2) wherein said first blocker and said second blocker unblock each write request in succession.

15. An apparatus as described in claim 14 further comprising an updater for updating Copy 1A with a value determined by Thread A before said writing the value of Copy 1A to Data 1.

16. An apparatus as described in claim 14 wherein said data manager continues to receive write requests for Data 1 while maintaining read access to said plurality of threads after receiving said write request from Thread A.

17. An apparatus as described in claim 14 wherein said unblocking each write request in succession comprises unblocking said pending write requests before said new write requests.

18. An apparatus as described in claim 14 wherein said unblocking each write request in succession comprises unblocking said pending write requests in the order in which they request a commit operation.

19. An apparatus as described in claim 14 wherein said unblocking each write request in succession comprises unblocking said new requests in the order in which said new write requests are received.

* * * * *